Aug. 30, 1932.  R. G. CLYNE  1,874,902

METHOD AND APPARATUS FOR CUTTING SHEETS

Filed Nov. 22, 1928

Inventor:
ROBERT G. CLYNE,
By John N Bruinga
His Attorney.

Patented Aug. 30, 1932

1,874,902

UNITED STATES PATENT OFFICE

ROBERT G. CLYNE, OF ST. LOUIS, MISSOURI, ASSIGNOR TO WESTERN CARTRIDGE COMPANY, OF EAST ALTON, ILLINOIS, A CORPORATION OF DELAWARE

METHOD AND APPARATUS OF CUTTING SHEETS

Application filed November 22, 1928. Serial No. 321,086.

This invention pertains to a method and means for cutting sheets, such as sheets of paper and the like.

In the manufacture of explosive powder by certain processes the finished product is produced in the form of a thin sheet very similar to a sheet of paper. As the powder must be used in granular form, these sheets must be cut into small bits of a suitable size for use in cartridges and the like. It is important in cutting the sheets that the cut particles be cut entirely free so that the cut product will consist of free individual particles. In cutting methods and machines heretofore used it has been difficult to avoid a defect in the operation as a result of which the cut particles are left with a thin web joining one particle to another. This may be due to faulty adjustment of the apparatus or to dull cutters or the like. In accordance with this invention a method and apparatus is provided in which the possibility of producing particles joined by a web is entirely eliminated.

One of the objects of this invention, therefore, is to provide a method and apparatus for cutting sheets into small particles, by which the cut particles will be entirely separated from one another.

Another object is to provide a method in which the depth of cut and the rate of feed of sheet are co-ordinated in such a manner that the cut particles will be entirely separated from one another.

Another object is to provide a machine for cutting sheets in which the cutters are simple in form and easily kept in good condition.

Further objects will appear from the following description taken in connection with the accompanying drawing, in which.

Figure 1:
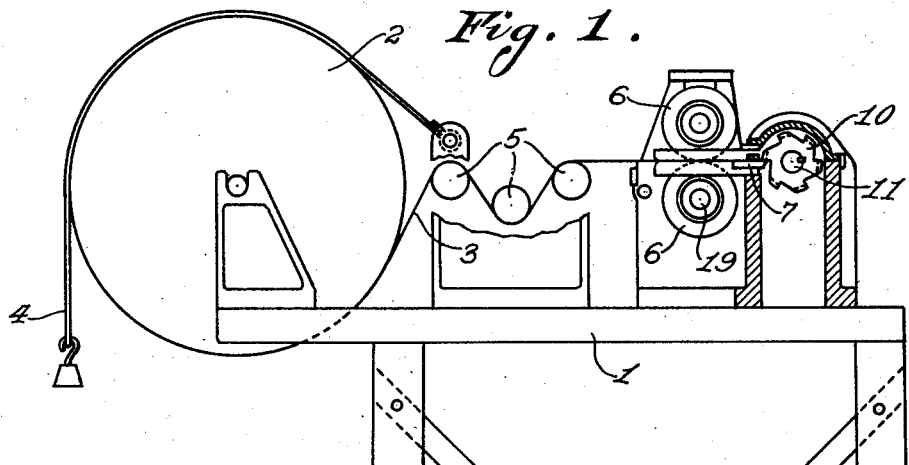
Fig. 1 is a side view of a machine embodying this invention.
Figure 2:
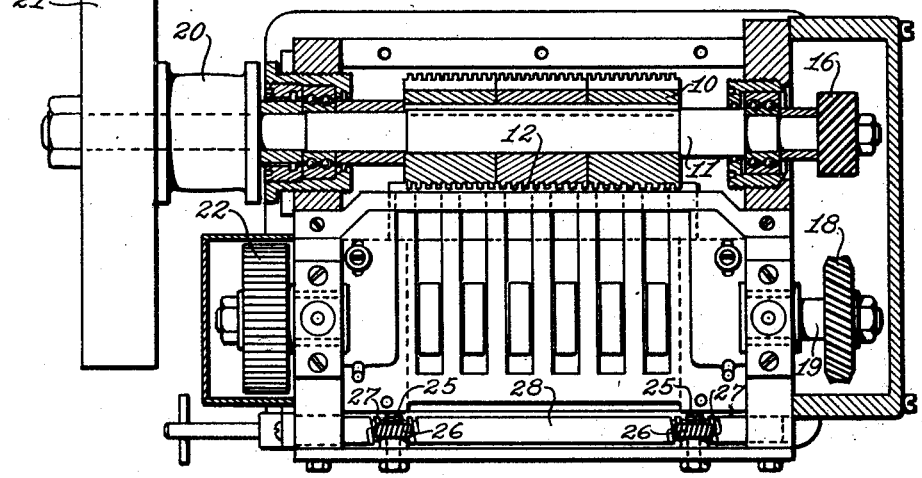
Fig. 2 is a plan view partly in section showing the feeding and cutting devices.
Figure 3:
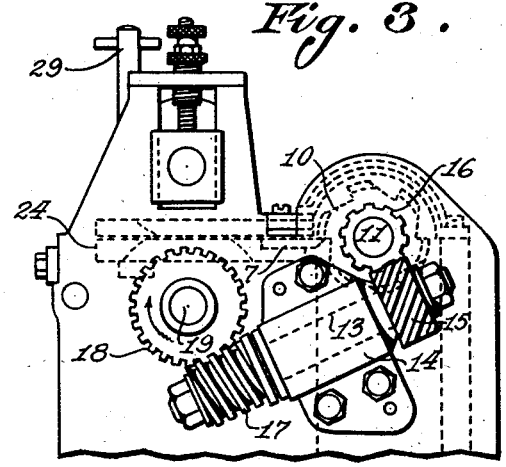
Fig. 3 is an end view of Fig. 2.

Referring to the drawing 1 designates a base or support of any suitable character upon which the other elements of the machine are mounted. A suitable reel 2 on which the sheet 3 is wound is provided with a suitable braking device 4 to prevent over-running of the same. The sheet 3 passes over a series of guide rolls 5 to a pair of feed rolls 6. After leaving the feed rolls 6 the sheet passes over a cutter bar 7.

Figure 4:
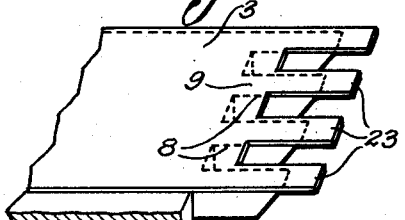
Fig. 4 is an enlarged perspective detail of a portion of the cutter bar showing the relation of the sheet thereto at the time the cutting operation takes place.

The cutting edge of the cutter bar 7 is shown in detail in Fig. 4. This edge is provided with a series of notches 8 with teeth 9 therebetween. Both the end and side edges of the teeth as well as the base of the notch are sharpened for cutting. A movable cutter 10 is mounted for rotation on a shaft 11, mounted in suitable bearings on the support 1. The cutter 10 is provided with a plurality of sets or rows of teeth with notches therebetween corresponding to and fitting the notches 8, and the teeth 9 of the cutter bar 7. The cutter 10 is mounted so that upon rotation thereof the rows of teeth 12 will be passed in succession through the notches 8 of the cutter bar so that a sheet resting upon the cutter bar, as illustrated in Fig. 4, will have a corresponding series of notches cut therein.

A shaft mounted in a suitable bearing 14 has fixed thereto at one end a spiral gear 15 adapted to mesh with a corresponding spiral gear 16 on the cutter shaft 11. The other end of the shaft 13 has fixed thereto a worm 17 engaging a worm wheel 18 on a shaft 19 of one of the feed rolls 6. The other end of the shaft 11 may be provided with a pulley 20 by which the same may be driven in rotation. A fly-wheel 21 may also be provided to insure uniform rotation. When the shaft 11 is driven the shaft 19 will be driven at a definite speed relatively thereto. The feed rolls 6, whose shafts are provided with intermeshing gears so as to insure their rotation together, will, therefore, be driven at a definite and fixed rate of rotation relatively to that of the cutter 10. The adjustment is such that the distance through which the sheet 3 is fed forwardly between cutters is less than the depth of the notch 8.

It will be seen that in the operation of this machine, the sheet 3 will be fed forwardly between cuts a distance less than the depth of the notches cut in the sheet by the previous cutting operation. At the completion of such feeding movement and as the teeth 12 of the movable cutter 10 are just about to enter the notch 8 of the stationery cutter 7 the sheet 3 will be substantially in the position illustrated in Fig. 4.

It will be noted that the extent of the feeding movement has been such that only a portion of each of the tabs 23, formed by notching the sheet, projects beyond the corresponding tooth 9 of the cutter bar a distance less than the length of the tab or the depth of the notch between tabs. This leaves a short end of each tab in a projecting position to be cut off by the next operation. The bottom of each notch in the sheet has also been advanced a corresponding distance ahead of the bottom of the notch 8 in the cutting bar so that the tooth of the movable cutter will cut out this section of the sheet and again deepen the notch to its former dimension. It will be seen, therefore, that the notches are never eliminated from the edge of the sheet but at each operation the end of the tab is clipped off and the notch between tabs is deepened both by the same amount, and this amount is less than the depth of the notch. In other words, each cutting stroke is carried to a depth greater than the distance the material is fed, a certain portion of the cutting stroke being blank or idle as far as cutting material is concerned.

By virtue of the fact that the amount of forward feed between cuts is less than the depth of the notches a certain portion of each notch remains to be passed through a second time by the successive cutter tooth. This insures that no web joining the parts clipped off can possibly be left. The product, is therefore, produced in the form of clean cut individual particles, usually square in form and no cuts of any other shape such as the remains or portions of joining webs are found in the product.

In order to provide for easily keeping the cutting elements in good condition, the rotating cutter is accurately formed and hardened, while the stationary cutter 7 is left relatively soft. The cutter bar 7 is mounted on a plate 24 which may be fed forward and back for adjustment by means of a pair of screws 25. The adjusting screws 25 are each equipped with a worm wheel 26 engaging a worm 27 on an adjusting shaft 28 provided with an operating handle 29. By turning the shaft 28, the screws 25 may be fed forwardly by a very fine adjustment. By feeding the cutter bar 7 forwardly a slight amount and then rotating the cutter 10, the latter being harder will cut out and reform the teeth and notches of the cutter bar 7. In this way the cutting edges can be maintained in good condition.

It will be seen, therefore, that this invention provides a simple and effective method as well as apparatus for cutting sheets of the character described into small bits or particles. In accordance with this method these sheets are notched at the edges and then between successive cuts fed forward a distance less than the depth of the notches. This insures the absence of joining webs between the cut particles as previously described. The mechanism is simple and easy of adjustment and the cutters are so arranged as to be maintained in good condition in a simple and effective manner.

It will be understood that certain features of this invention are useful without reference to certain other features or combinations thereof, and the use of such sub-combinations is contemplated by this invention. It is obvious that various changes may be made in details of construction and operation, within the scope of the appended claims, without departing from the spirit of this invention; it is, therefore, to be understood that this invention is not to be limited to the specific details shown and described.

Having thus described the invention what is claimed is:

1. The method of cutting sheets, comprising, cutting a notch in the edge of the sheet so as to leave a tab therebeside, and again cutting the sheet so as to simultaneously deepen the notch and clip the tab by an amount less than the depth of the notch.

2. The method of cutting sheets, comprising, cutting a succession of notches in the edge of the sheet so as to leave tabs therebeside, and thereafter making successive similar cuts at distances from the preceding cuts less than the depth of the notches.

3. A sheet cutting machine, comprising, a stationary cutter having a notch, a movable cutter having a tooth cooperating with said stationary cutter to notch the sheet, and means adapted to feed the sheet adapted to move the same between successive notching cuts a distance less than the depth of said notch.

4. A sheet cutting machine, comprising, a stationary cutter having a notch, a movable cutter having a tooth cooperating with said stationary cutter to notch the sheet, and means for continuously feeding the sheet between successive notching cuts a distance less than the depth of said notch.

5. A sheet cutting machine, comprising, a stationary cutter having a notch, a rotating cutter having a series of teeth cooperating with said stationary cutter to notch the sheet successively, means for feeding the sheet and gearing connecting said rotating cutter and said feeding means adapted to move the latter so as to feed the sheet between notching cuts a distance less than the depth of said notch.

6. A sheet cutting machine, comprising, a stationary cutter having a notch, and a movable cutter having a tooth cooperating with said stationary cutter to notch the sheet, said stationary cutter being of relatively soft material and said movable cutter being hardened adapted to sharpen the edge of said stationary cutter.

7. A sheet cutting machine, comprising, means for feeding a sheet, a pair of cutters having cooperating notches and teeth extending in the direction of feed, means for moving said cutters relatively to notch the sheet, and means for regulating said feeding means to feed the sheet between cuts a distance less than the depth of the notches of the cutters.

8. A sheet cutting machine, comprising, means for feeding a sheet, a pair of cutters having cooperating notches and teeth extending in the direction of feed, means for moving said cutters relatively to notch the sheet, and means connecting said feeding means and said moving means adapted to regulate their relative movement so as to feed the sheet between cuts a distance less than the depth of the notches of the cutters.

9. A sheet cutting machine, comprising, means for feeding a sheet, a pair of cutters having cooperating notches and teeth extending in the direction of feed, and means for driving said cutting and said feeding means so as to feed the sheet between cuts a distance less than the depth of the notches of the cutters.

10. The method of cutting sheets, comprising, taking successive cuts, and at each of these causing the cutting tool to again pass through a portion of the material already traversed by it.

In testimony whereof, I affix my signature this 8th day of October, 1928.

ROBERT G. CLYNE.